(12) United States Patent
Hushon

(10) Patent No.: US 9,009,098 B1
(45) Date of Patent: Apr. 14, 2015

(54) METHODS AND APPARATUS FOR CREATING A CENTRALIZED DATA STORE

(75) Inventor: Dan Hushon, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 1000 days.

(21) Appl. No.: 12/164,738

(22) Filed: Jun. 30, 2008

(51) Int. Cl.
*G06F 7/00* (2006.01)
*G06F 17/00* (2006.01)
*G06F 17/30* (2006.01)

(52) U.S. Cl.
CPC .... *G06F 17/30563* (2013.01); *G06F 17/30575* (2013.01)

(58) Field of Classification Search
CPC .............. G06F 17/30563; G06F 17/30575; G06F 17/30377
USPC .......... 707/600, 602, 603, 609, 610, 620, 623
See application file for complete search history.

(56) References Cited

U.S. PATENT DOCUMENTS

| | | | | |
|---|---|---|---|---|
| 5,870,759 A | * | 2/1999 | Bauer et al. | 707/201 |
| 5,884,310 A | * | 3/1999 | Brichta et al. | 707/10 |
| 5,937,414 A | * | 8/1999 | Souder et al. | 707/616 |
| 6,460,051 B1 | * | 10/2002 | LaRue et al. | 707/201 |
| 6,477,545 B1 | * | 11/2002 | LaRue | 707/625 |
| 6,983,293 B2 | * | 1/2006 | Wang | 707/201 |
| 7,139,780 B2 | * | 11/2006 | Lee et al. | 707/204 |
| 7,246,144 B2 | * | 7/2007 | Walsh et al. | 709/200 |
| 7,299,285 B2 | * | 11/2007 | Kasper, II | 709/226 |
| 7,366,743 B2 | * | 4/2008 | Sawadsky et al. | 707/999.204 |
| 7,401,101 B2 | * | 7/2008 | Hild et al. | 707/104.1 |
| 7,421,430 B2 | * | 9/2008 | Meng | 707/8 |
| 7,599,903 B2 | * | 10/2009 | Gunther et al. | 707/1 |
| 7,627,611 B2 | * | 12/2009 | Gusciora | 707/200 |
| 7,783,607 B2 | * | 8/2010 | Cooper et al. | 707/662 |
| 2005/0055328 A1 | * | 3/2005 | Yagawa | 707/1 |

* cited by examiner

*Primary Examiner* — Marc Somers
(74) *Attorney, Agent, or Firm* — Krishnendu Gupta; Gerald P. Kazanjian

(57) ABSTRACT

A system extracts data from at least one database. The data is extracted into a data set. The system performs a transformation function on the data extracted into the data set. The transformation function is performed for the purpose of determining a preferred version of data from at least one database. The database is capable of being updated with the preferred version of data such that the database is capable of being synchronized with the centralized data store. The system loads the preferred version of data into the centralized data store.

21 Claims, 12 Drawing Sheets

215 SUPPLY THE DATA FOR THE NEW REQUEST FROM THE CENTRALIZED DATA STORE TO THE APPLICATION

216 AUTHENTICATE A CONNECTION BETWEEN THE APPLICATION REQUESTING DATA FROM THE AT LEAST ONE DATABASE AND THE CENTRALIZED DATA STORE

217 PERFORM A QUERY ON THE CENTRALIZED DATA STORE, THE QUERY ASSOCIATED WITH THE NEW REQUEST

218 TRANSMIT A RESULT OF THE QUERY ON THE CENTRALIZED DATA STORE FROM THE CENTRALIZED DATA STORE TO THE APPLICATION

*FIG. 7*

219 EXTRACT DATA FROM THE AT LEAST ONE DATABASE, THE DATA EXTRACTED INTO A DATA SET

220 EXTRACT A FIRST DATA SET FROM A FIRST DATABASE

221 TRANSMIT THE FIRST DATA SET FROM THE FIRST DATABASE TO A SECOND DATABASE

222 TRANSMIT ORIGINATION INFORMATION ALONG WITH THE FIRST DATA SET, THE ORIGINATION INFORMATION IDENTIFYING THE FIRST DATA SET AS HAVING ORIGINATED FROM THE FIRST DATABASE

223 EXTRACT A SECOND DATA SET FROM THE SECOND DATABASE

*FIG. 8*

METHODS AND APPARATUS FOR CREATING A CENTRALIZED DATA STORE

BACKGROUND

The rapid expansion of information service and data industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks.

Additionally, data may be collected from older databases (sometimes referred to as legacy or heritage databases). The data from these older databases may be compiled on a centralized data warehouse, or data store, along with the data captured by current processes. A data warehouse is essentially a repository of an organization's electronically stored data. Compiling an organization's data in a centralized data warehouse facilitates reporting and analysis. Reporting can be achieved by writing an application interface that allows data to be extracted from both the heritage databases and the data captured by current processes. The application interface may be updated as additional heritage databases are added to the enterprise warehouse.

As organization grow, there can be a multitude of data storage systems, both current and legacy databases. This can result in a de-centralization of databases that results in unsynchronized replication of data. Organizations need a single version of valid data (a master data store). Within an organization, financial book keeping, customer management, product management, etc. may use different systems and represent data differently, for example, calling the same attribute by different variables and data types. Further, these systems are likely to change independently causing synchronization problems.

SUMMARY

Conventional mechanisms and techniques for creating a centralized data store suffer from a variety of deficiencies. In particular, conventional mechanisms and techniques are limited in that applications that interface with the centralized data store and the heritage databases must be re-written to accommodate the different databases. Different databases have different database designs requiring different code (for example, Structured Query Language (SQL) queries) to be written for each database to extract the same type of data from each database. Additionally, there exist different drivers (such as Java Database Connectivity (JDBC) and Open Database Connectivity (ODBC)) for establishing a connection between the application and the database. Extracting the same type of data from multiple databases may require re-writing interface code for each driver and for each database. When the same type data is extracted from different databases, the values of that data may not match. Conventional mechanisms and techniques for creating a centralized data store do not have the ability to determine which of the different values (from each of the different databases) is the best version of the data. For example, there may exist several databases that provide an address of an organization's customer. However, the databases may return different addresses. A heritage database may return an older, obsolete address while an organization's current address database may return the most recent address. Conventional mechanisms and techniques for creating a centralized data store do not have transformation functions that perform a comparison on the returned data to return the 'best' data to the application that requested the customer's address.

Embodiments disclosed herein operate to significantly overcome these and other deficiencies associated with conventional mechanisms and techniques for creating a centralized data store. In particular, embodiments disclosed herein provide a centralized data store creating process that extracts data from the at least one database. The data is extracted into a data set. The centralized data store creating process performs a transformation function on the data extracted into the data set. The transformation function is performed for the purpose of determining a preferred version of data from the database (or databases). The database(s) are capable of being updated with the preferred version of data such that the database(s) are capable of being synchronized with the centralized data store. The centralized data store creating process loads the preferred version of data into the centralized data store. It should be noted that the term database may also refer to a data store, and the term database connector may also refer to a data store connector. For example, a data store may include, but is not limited to, a traditional database management system or other data storage products such as file systems. It should also be noted that these databases or data stores may be operating independently, making independent changes. This requires a solution that ensures data consistency. In other words, the data stores may or may not be running on the same server.

For example, the centralized data store creating process extracts data from at least one database. The data is extracted into a data set. In an example embodiment, an application requests data from a database. The application transmits a request to the database. The request, for example, may be a SQL query that runs to insert/extract/read/modify data in the database. A driver (such as JDBC or ODBC) performs an authentication process on the connection between the application and the database. The database receives the request, performs the SQL query against the data in the database and then returns the result.

The centralized data store creating process performs a transformation function on the data extracted into the data set. The transformation function is performed for the purpose of determining a preferred version of data from at least one database. In an example embodiment, the database is capable of being updated with the preferred version of data such that at least one database is capable of being synchronized with the centralized data store. In other words, the purpose of creating the centralized data store creating process is to have a repository of the 'best' data from a plurality of databases, including heritage databases.

The centralized data store creating process loads the preferred version of data into the centralized data store. Once the transformation function has determined the 'best' data from the data extracted from at least one database, the centralized data store creating process loads this data into the centralized data store. Thus, the centralized data store creating process maintains the 'best' data from the data extracted from all the databases.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., Compact Disc Read-only memory (CD-ROM)), floppy or hard disk or other a medium such as firmware or microcode in one or more read-only memory (ROM) or random access memory (RAM) or programmable read-only memory (PROM) chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

FIG. 7 illustrates a flowchart of a procedure performed by the system of FIG. 1 when the centralized data store creating process supplies the data for the new request from the centralized data store to the application, according to one embodiment disclosed herein.

FIG. 8 illustrates a flowchart of a procedure performed by the system of FIG. 1 when the centralized data store creating process extracts data from at least one database, extracting a first data set from a first database, according to one embodiment disclosed herein.

DETAILED DESCRIPTION

Embodiments disclosed herein include methods, apparatus and systems that provide a centralized data store creating process. The centralized data store creating process extracts data from at least one database. The data is extracted into a data set. The centralized data store creating process performs a transformation function on the data extracted into the data set. The transformation function is performed for the purpose of determining a preferred version of data from the database (or databases). The database(s) are capable of being updated with the preferred version of data such that the database(s) are capable of being synchronized with the centralized data store. The centralized data store creating process loads the preferred version of data into the centralized data store.

Figure 1:
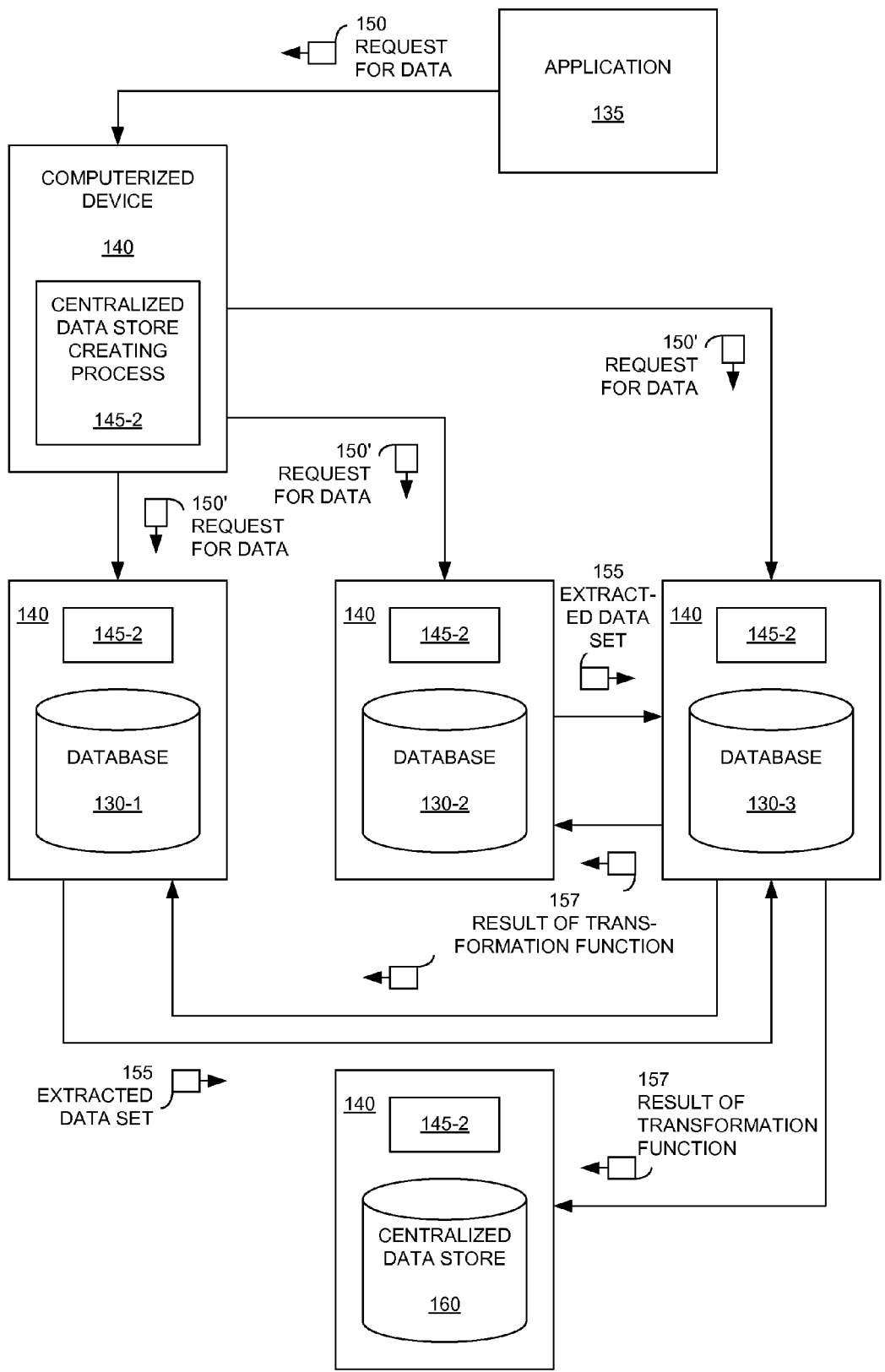
FIG. 1 illustrates an example computing system environment including the centralized data store creating process configured to operate sequentially according to embodiments disclosed herein.

FIG. 1 illustrates an example of a computing system environment suitable for use in explaining example embodiments. In this example, the computing system environment includes an application 135 that requests data from a database 130-1. A computerized device 140 operating the centralized data store creating process 145-2 intercepts the request from the application 135. In this example, the request is forked to a plurality of databases 130-N (e.g. database 130-1, database 130-2 and database 130-3) each operating on a computerized device 140 that includes the centralized data store creating process 145-2. The request for data from the databases 130-N is simultaneously sent to each database 130-N (database 130-1, database 130-2 and database 130-3) operating the centralized data store creating process 145-2. A data set 155 is extracted from each of the databases 130-N (e.g., database 130-1, database 130-2 and database 130-3). Database 130-1 and database 130-2 transmit their respective data sets 155 to database 130-3. Database 130-3, designated as the master database 130-3 performs a transformation function on the received data sets 155. Database 130-3 then transmits the result of the transformation function 157 to database 130-1, database 130-2 and the centralized data store 160. It should be noted that the centralized data store creating process 145-2 is also operating on a computerized device 140 that includes the centralized data store creating process 145-2.

Figure 2:
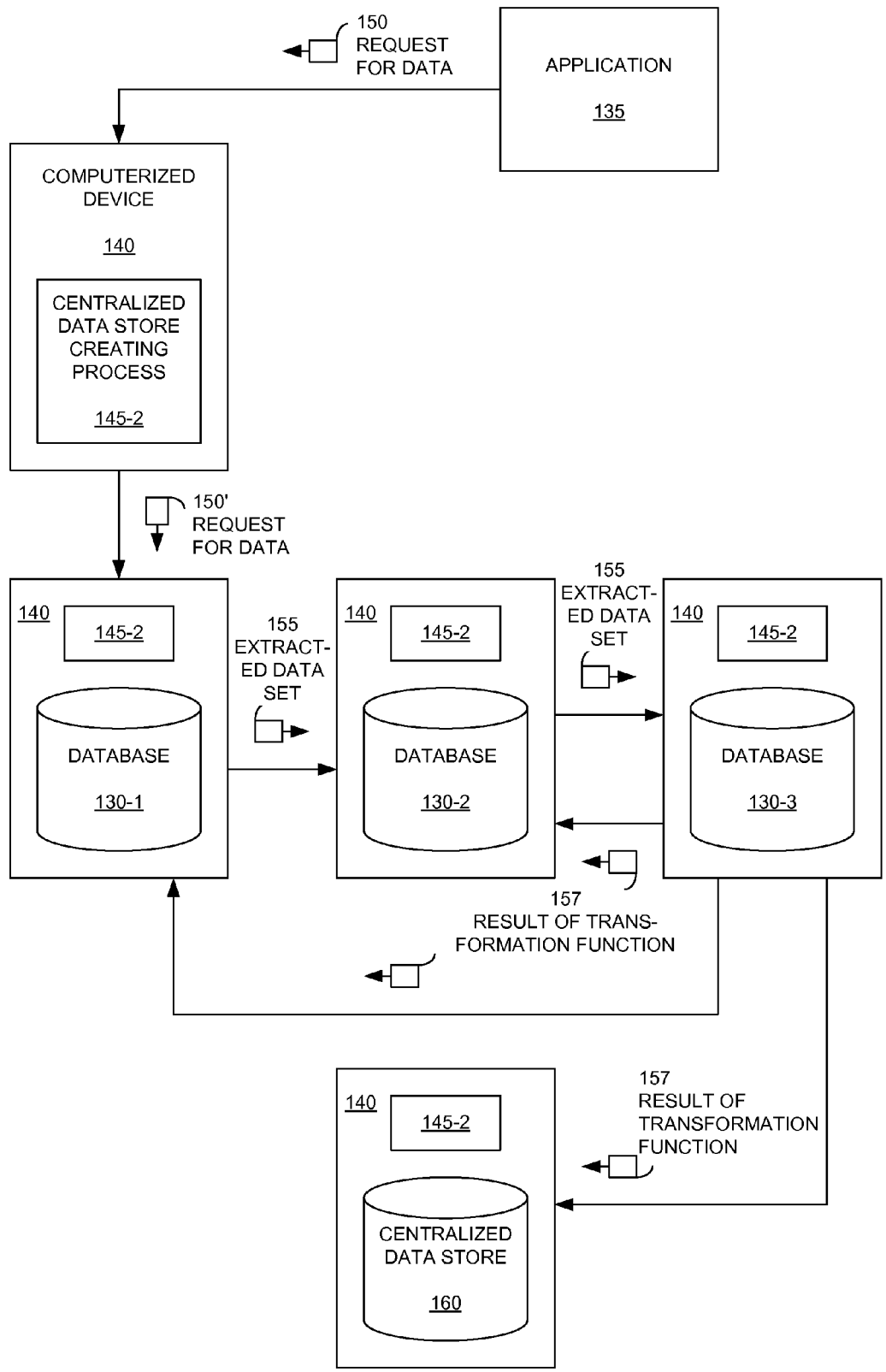
FIG. 2 illustrates an example computing system environment including the centralized data store creating process configured to operate in parallel according to embodiments disclosed herein.

FIG. 2 illustrates an example of a computing system environment suitable for use in explaining example embodiments. In this example, the computing system environment includes an application 135 that requests data from a database 130-1. A computerized device 140 operating the centralized data store creating process 145-2 intercepts the request from the application 135. In this example, the request is transmitted to database 130-1. It should be noted that database 130-1, database 130-2, database 130-3 and the centralized data store 160 are each operating on independent computerized devices 140 that include the centralized data store creating process 145-2. Database 130-1 extracts a data set 155 according to the request. Database 130-1 transmits the data set 155 to database 130-2. Database 130-2 extracts a data set 155 according to the request, and performs a transformation function between the data set 155 from database 130-1 and the data set 155 from database 130-2. Database 130-2 transmits the result of the transformation function 157 to database 130-3. Database 130-3 extracts a data set 155 according to the request, and performs a transformation function between the data set 155 from database 130-3 and the result of the transformation function 157 performed by database 130-2. Database 130-3 transmits the result of the transformation function 157 to database 130-1, database 130-2 and the centralized data store 160.

Figure 3:
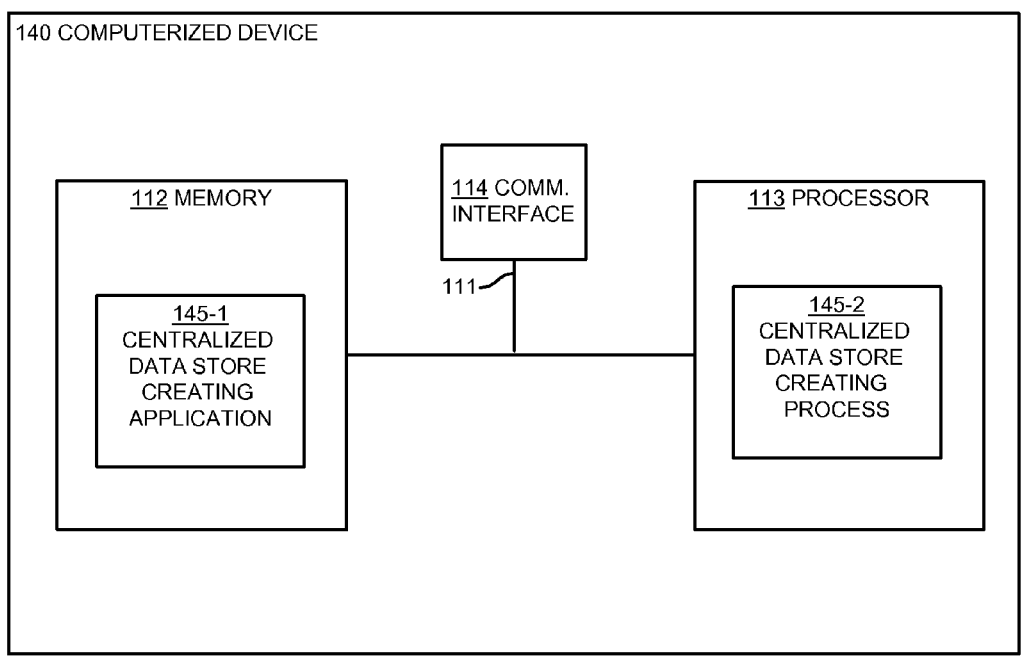
FIG. 3 illustrates an example computer system architecture for a computer system that operates a centralized data store creating process in accordance with embodiments disclosed herein.

FIG. 3 illustrates an example architecture of a computerized device 140. The computerized device 140 may be any type of computerized device such as a mainframe, computer server, personal computer, workstation, portable computing device, console, laptop, network terminal or the like. In this example, the computerized device 140 includes an interconnection mechanism 111 that couples a memory system 112, a processor 113, and a communications interface 114. The communications interface 114 enables the computerized device 140 to communicate with other devices (i.e., other computers) on a network (not shown). This can allow access to the centralized data store creating application 145-1 to be accessed by remote computer systems.

The memory system 112 may be any type of computer readable medium that is encoded with an centralized data store creating application 145-1 that may be embodied as software code such as data and/or logic instructions (e.g., code stored in the memory or on another computer readable medium such as a removable disk) that supports processing functionality according to different embodiments described herein. During operation of the computerized device 140, the processor 113 accesses the memory system 112 via the interconnect 111 in order to launch, run, execute, interpret or otherwise perform the logic instructions of the centralized data store creating application 145-1. Execution of the centralized data store creating application 145-1 in this manner produces processing functionality in a centralized data store creating process 145-2. In other words, the centralized data store creating process 145-2 represents one or more portions of runtime instances of the centralized data store creating application 145-1 (or the entire application 145-1) performing or executing within or upon the processor 113 in the computerized device 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the centralized data store creating process 145-2.

Figure 4:
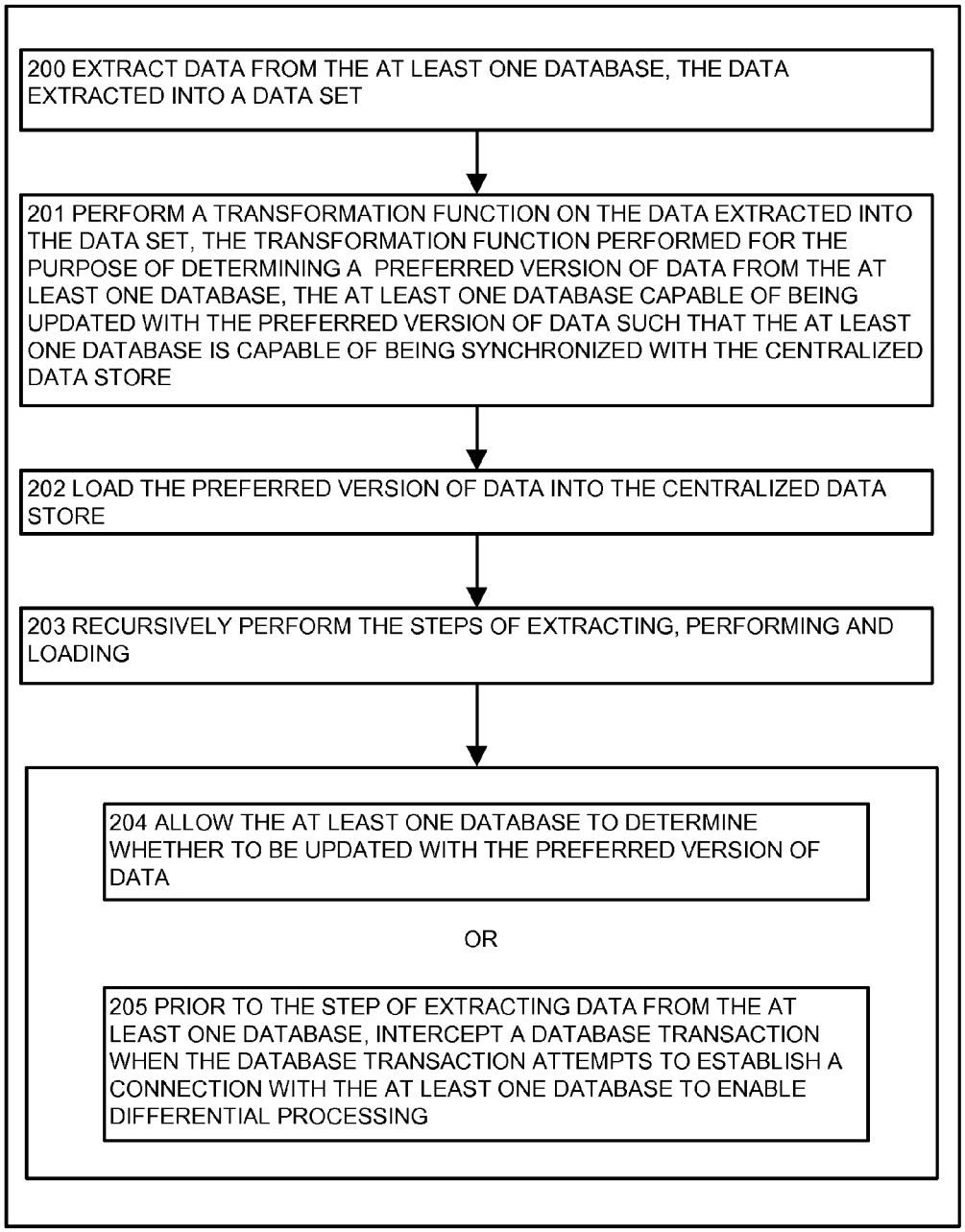
FIG. 4 illustrates a flowchart of a procedure performed by the system of FIG. 1 when the centralized data store creating process extracts data from at least one database, according to one embodiment disclosed herein.

FIG. 4 is a flowchart of the steps performed by the centralized data store creating process 145-2 when it extracts data from at least one database.

In step 200, the centralized data store creating process 145-2 extracts data from at least one database. The data is extracted into a data set 155. In an example embodiment, an application 135 requests data from a database 130-1. The application 135 transmits a request to the database 130-1. The request, for example, may be a SQL query that operates to insert/extract/read/modify data in the database 130-1. A driver (such as JDBC or ODBC) performs an authentication process on the connection between the application 135 and the database 130-1. The database 130-1 receives the request, performs the SQL query against the data in the database 130-1, and then returns the result.

In step 201, the centralized data store creating process 145-2 performs a transformation function on the data extracted into the data set. The transformation function is performed for the purpose of determining a preferred version of data from at least one database 130-1. In an example embodiment, the database 130-1 is capable of being updated with the preferred version of data such that at least one database 130-1 is capable of being synchronized with the centralized data store 160. In other words, the purpose of creating the centralized data store 160 is to have a repository of the 'best' data from a plurality of databases 130-N including heritage databases.

In step 202, the centralized data store creating process 145-2 loads the preferred version of data into the centralized data store 160. Once the transformation function has determined the 'best' data from the data extracted from at least one database 130-1, the centralized data store creating process 145-2 loads this data into the centralized data store 160. Thus, the centralized data store 160 maintains the 'best' data from the data extracted from all the databases 130-N.

In step 203, the centralized data store creating process 145-2 recursively performs the steps of extracting, performing and loading. The centralized data store creating process 145-2 recursively performs the steps of extracting the data, performing a transformation function, and loading the data into the centralized data store 160 or the databases 130-N from which the data was extracted. In an example embodiment, this is performed according to the following function:

$$Fx = E \times TF(fx) J \times L$$

$$fx = E(e, e', \ldots) \times T(fy(Es)) J \times L(Er, Es))$$

Where:
Fx is the recursive parent function
fx=atomic function
E is an extraction routine which extracts data into a set E(s) for comparison/operation F is an optional fork routine which can enable multiple participants to operate on the same source data rendering independent operational results T is a transformation step that operates on E fy is a function that operates on the elements of the E provided set E(s) resulting in a single object E(r)

E(r) is a the resulting object of T(fy)

L packages the set of results E(r) and optionally source data E(s) returning this to the caller J is a join behavior which serves to enable both parallel and sequential work streams with the ability to produce results which are programmatically integrated, and is consistent at point of exit from this step.

Alternatively, in step 204, the centralized data store creating process 145-2 allows at least one database 130-1 to determine whether to be updated with the preferred version of data. The centralized data store creating process 145-2 transmits the preferred data back to the database 130-1 from which that data was extracted. The data is transmitted to the database 130-1 to over write the existing data with the preferred version of the data into the database 130-1. Thus, the database 130-1 will now have the 'best' version of the data. In an example embodiment, the database 130-1 has the ability to override the process of overwriting the existing data with the preferred version of the data, and instead, retain the existing data.

Alternatively, in step 205, prior to the step of extracting data from at least one database, the centralized data store creating process 145-2 intercepts a database transaction when the database transaction attempts to establish a connection with at least one database 130-1 to enable differential processing. When the application 135 requests data from the database 130-1, a connection is established between the application 135 and the database 130-1. At this point, the centralized data store creating process 145-2 intercepts the request. By intercepting the request, the centralized data store creating process 145-2 can fork the request to both the database 130-1 and the centralized data store 160 to perform the transformation function on the data returned from both databases (i.e., the database 130-1 and the centralized data store 160). The forking process can be performed sequentially or in parallel.

Figure 5:
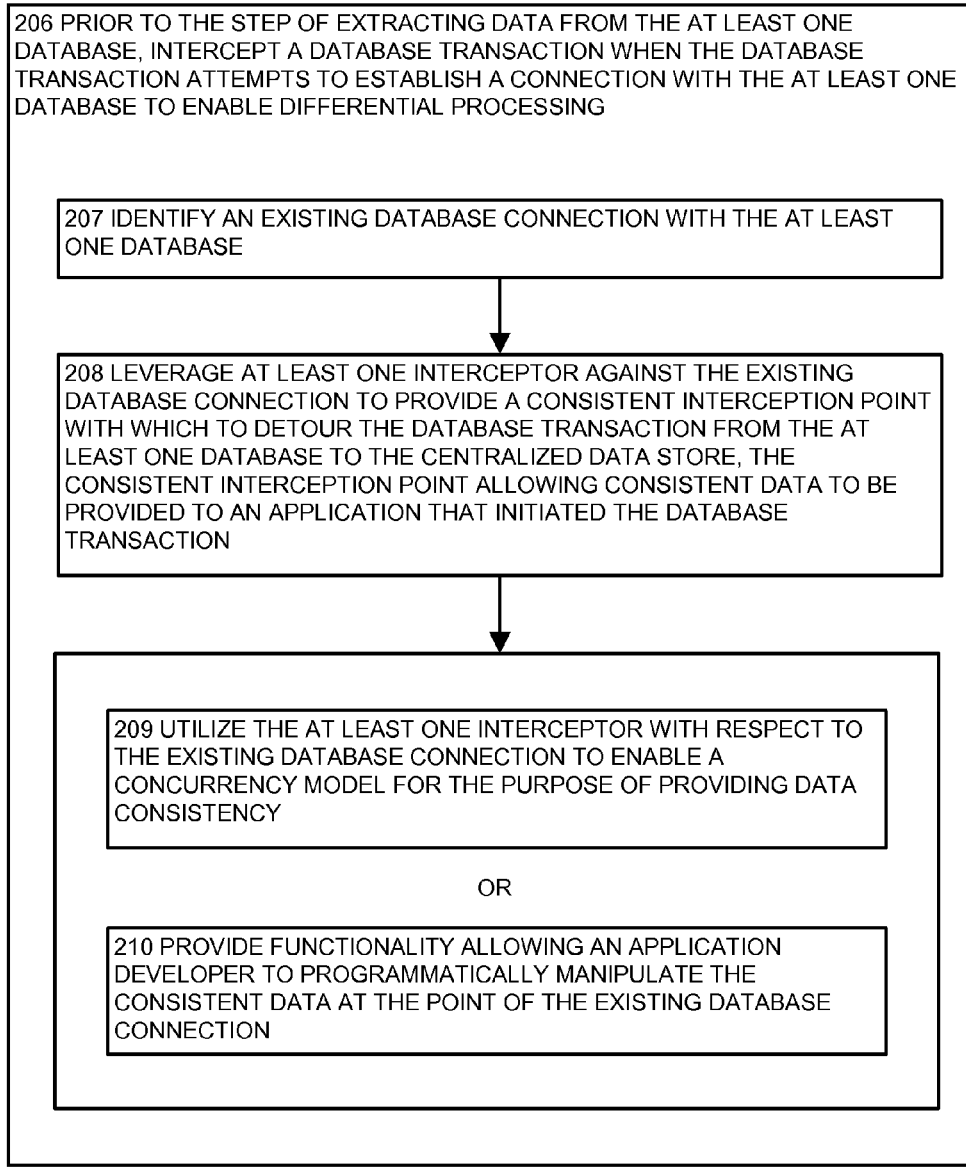
FIG. 5 illustrates a flowchart of a procedure performed by the system of FIG. 1 when the centralized data store creating process intercepts a database transaction when the database transaction attempts to establish a connection with at least one database to enable differential processing, according to one embodiment disclosed herein.

FIG. 5 is a continuation of the flowchart in FIG. 4 of the steps performed by the centralized data store creating process 145-2 when the centralized data store creating process 145-2 intercepts a database transaction when the database transaction attempts to establish a connection with at least one database 130-1 to enable differential processing.

In step 206, prior to the step of extracting data from at least one database, the centralized data store creating process 145-2 intercepts a database transaction when the database transaction attempts to establish a connection with at least one database 130-1 to enable differential processing through a detour to the mastering logic.

In step 207, the centralized data store creating process 145-2 identifies an existing database connection with at least one database 130-1. In an example embodiment, the database connection may involve an JDBC or ODBC driver that has previously established a connection to the database 130-1.

In step 208, the centralized data store creating process 145-2 leverages at least one interceptor against the existing database connection to provide a consistent interception point with which to detour the database transaction from at least one database 130-1 to the centralized data store 160. The consistent interception point allows consistent data to be provided to an application 135 that initiated the database transaction. The database transaction may include inserting/deleting/reading/modifying data within the database 130-1.

In step 209, the centralized data store creating process 145-2 utilizes at least one interceptor with respect to the existing database connection to enable a concurrency model for the purpose of providing data consistency. In an example embodiment, the concurrency model may include both optimistic and pessimistic concurrency models. These concurrency models are employed to improve the consistency of data provided to applications.

Alternatively, in step 210, the centralized data store creating process 145-2 provides functionality allowing an application developer to programmatically manipulate the consistent data at the point of the existing database connection. For example, the data received at the point of the existing database connection may be ignored, passed unfettered, or merged with the application's existing data providing a hybrid response.

Figure 6:
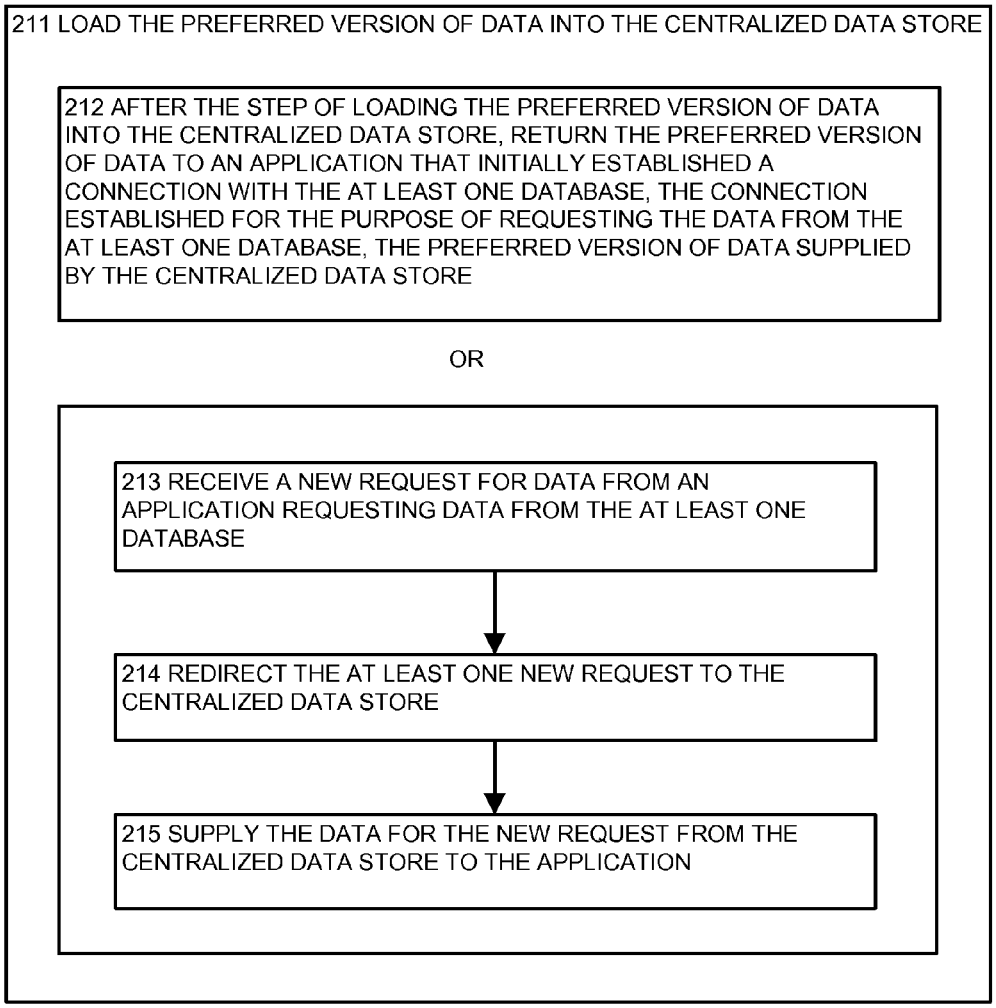
FIG. 6 illustrates a flowchart of a procedure performed by the system of FIG. 1 when the centralized data store creating process loads the preferred version of data into the centralized data store, according to one embodiment disclosed herein.

FIG. 6 is a flowchart of the steps performed by the centralized data store creating process 145-2 when it loads the preferred version of data into the centralized data store 160.

In step 211, the centralized data store creating process 145-2 loads the preferred version of data into the centralized data store 160. The centralized data store creating process 145-2 performs a recursive process of extracting data, transforming data and loading the data. When the preferred version of the data has been returned by the transformation function, the centralized data store creating process 145-2 loads the preferred data into the centralized data store 160. In an example embodiment, the centralized data store creating process 145-2 also returns the preferred version of the data to the database(s) 130-N from which the data (used in the transformation function) was extracted.

In step 212, after the step of loading the preferred version of data into the centralized data store 160, the centralized data store creating process 145-2 returns the preferred version of data to an application 135 that initially established a connection with at least one database 130-1. The connection is established for the purpose of requesting the data from at least one database 130-1. In this embodiment, the preferred version of data is supplied by the centralized data store 160. In other words, an application 135 requested data from database 130-1. The data was extracted from database 130-1, and, for example, database 130-2. A transformation function was performed between the two sets of data. The preferred version of data was determined and transmitted to the centralized data store 160. Even though the application 135 requested the data from database 130-1, the preferred version of data is supplied to the application 135 from the centralized data store 160.

Alternatively, in step 213, the centralized data store creating process 145-2 receives a new request for data from an application 135 requesting data from at least one database 130-1. In an example embodiment, the centralized data store 160 is assumed to have the preferred version of data.

In step 214, the centralized data store creating process 145-2 redirects the new request to the centralized data store 160. In this example, rather than transmitting the request to database 130-1 (or database 130-2 or database 130-3), the centralized data store creating process 145-2 redirects the request for data to the centralized data store 160.

In step 215, the centralized data store creating process 145-2 supplies the data for the new request from the centralized data store 160 to the application 135. In other words, an application 135 requests data from one of the databases 130-N (i.e., database 130-1, database 130-2 or database 130-3). Instead of transmitting the request for data to the respective database 130-1, the centralized data store creating process 145-2 transmits the request for data to the centralized data store 160. The centralized data store creating process 145-2, in response to the request for data, supplies the data (from the centralized data store 160) to the application 135.

FIG. 7 is a continuation of the flowchart of FIG. 6 of the steps performed by the centralized data store creating process 145-2 when it supplies the data for the new request from the centralized data store 160 to the application 135.

In step 215, the centralized data store creating process 145-2 supplies the data for the new request from the centralized data store 160 to the application 135. In an example embodiment, the centralized data store 160 is considered to have the preferred version of data. Requests transmitted to other databases (such as database 130-1, database 130-2 or database 130-3) are redirected to the centralized data store 160. The centralized data store creating process 145-2 (operating on the centralized data store 160) extracts the data from the centralized data store 160 and supplies that data to the requesting application 135.

In step 216, the centralized data store creating process 145-2 authenticates a connection between the application 135 requesting data from at least one database and the centralized data store 160. Typically, when an application 135 requests data from a database 130-1, the application 135 authenticates a connection (for example, using JDBC or ODBC) between the application 135 and database 130-1. When the data request is redirected to the centralized data store 160, the centralized data store creating process 145-2 performs a new authentication process between the application 135 and the centralized data store 160.

In step 217, the centralized data store creating process 145-2 performs a query on the centralized data store 160. The query is associated with the new request. In an example embodiment, once the new authentication has been performed between the application 135 and the centralized data store 160, the centralized data store creating process 145-2 runs the query (requesting data) on the centralized data store 160.

In step 218, the centralized data store creating process 145-2 transmits a result of the query on the centralized data store 160 from the centralized data store 160 to the application 135. After the query is run on the centralized data store 160, the centralized data store creating process 145-2 transmits the resulting data from the centralized data store 160 to the application 135 from which the new request originated.

FIG. 8 is a flowchart of the steps performed by the centralized data store creating process 145-2 when it extracts data from at least one database 130-1.

In step 219, the centralized data store creating process 145-2 extracts data from at least one database 130-1. The data is extracted into a data set 155.

In step 220, the centralized data store creating process 145-2 extracts a first data set from a first database 130-1. In this scenario, as shown in FIG. 2, the centralized data store creating process 145-2 is performed sequentially. In an example embodiment, an application 135 requests data that database 130-1, database 130-2 and database 130-3 maintain.

In step 221, the centralized data store creating process 145-2 transmits the first data set 155 from the first database 130-1 to a second database 130-2. The centralized data store creating process 145-2 runs a query on the first database 130-1 to extract data into a first data set 155, and transmits that first data set 155 to the second database 130-2.

In step 222, the centralized data store creating process 145-2 transmits origination information along with the first data set 155. The origination information identifies the first data set 155 as having originated from the first database 130-1. The first data set 155 is transmitted from the first database 130-1 to the second database 130-2, along with routing information such as where the first data set 155 came from (i.e., the first database 130-1) and where the first data set 155 is being transmitted to (i.e., the second database 130-2).

In step 223, the centralized data store creating process 145-2 extracts a second data set 155 from the second database 130-2. The second database 130-2 receives the first data set 155 from the first database 130-1, along with the origination information associated with the first data set 155. The second database 130-2 extracts a second data set 155 from the second database 130-2.

Figure 9:
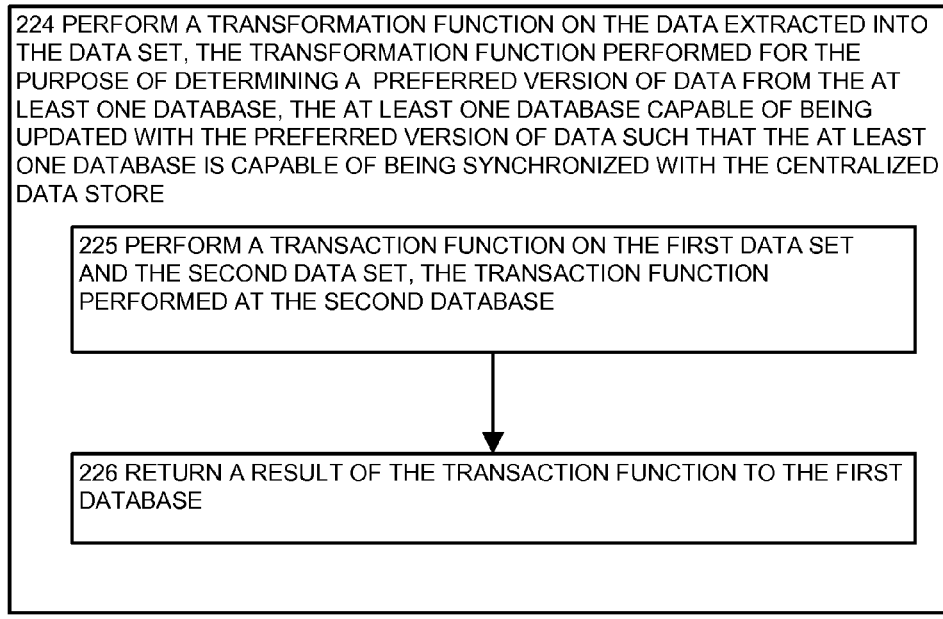
FIG. 9 illustrates a flowchart of a procedure performed by the system of FIG. 1 when the centralized data store creating process performs a transformation function on the data extracted into the data set, according to one embodiment disclosed herein.

FIG. 9 is a continuation of FIG. 8 of a flowchart of the steps performed by the centralized data store creating process 145-2 when it performs a transformation function on the data extracted into the data set 155.

In step 224, the centralized data store creating process 145-2 performs a transformation function on the data extracted into the data set. The transformation function is performed for the purpose of determining a preferred version of data from at least one database. The database is capable of being updated with the preferred version of data such that at least one database is capable of being synchronized with the centralized data store 160.

In step 225, the centralized data store creating process 145-2 performs a transaction function on the first data set 155 and the second data set 155. The transaction function is performed at the second database 130-2. Referring to the scenario explained in FIG. 8, a first data set 155 was extracted from the first database 130-1 and transmitted to the second database 130-2. The second database 130-2 extracted a second data set 155 (from the second database 130-2). The centralized data store creating process 145-2 operating on the second database 130-2 performs a transformation function on both the first data set 155 and the second data set 155 to obtain the preferred version of the data. It should be noted that this sequential process continues for as many databases 130-N from which data is requested. Therefore, if there were a fourth database 130-4 (not shown), a fifth database 130-5 (not shown) and a sixth database 130-6 (not shown), the second database 130-2 would then transmit the result of the transformation function to the fourth database 130-4. The fourth database 130-4 would extract a fourth data set 155 (not shown) from the fourth database 130-4. The fourth database 130-4 would then perform the transformation function on the fourth data set 155 and the result of the transformation function between the first data set 155 (from the first database 130-1) and the second data set 155 (from the second database 130-2). The fourth database 130-4 would then transmit this result to the fifth database 130-5 where the process would repeat. The result of that transformation function would then be transmitted to the sixth database 130-6.

In step 226, the centralized data store creating process 145-2 returns a result (i.e., the preferred version of the data based on the first data set 155 from the first database 130-1 and the second data set 155 from the second database 130-2) of the transaction function to the first database 130-1.

Figure 10:
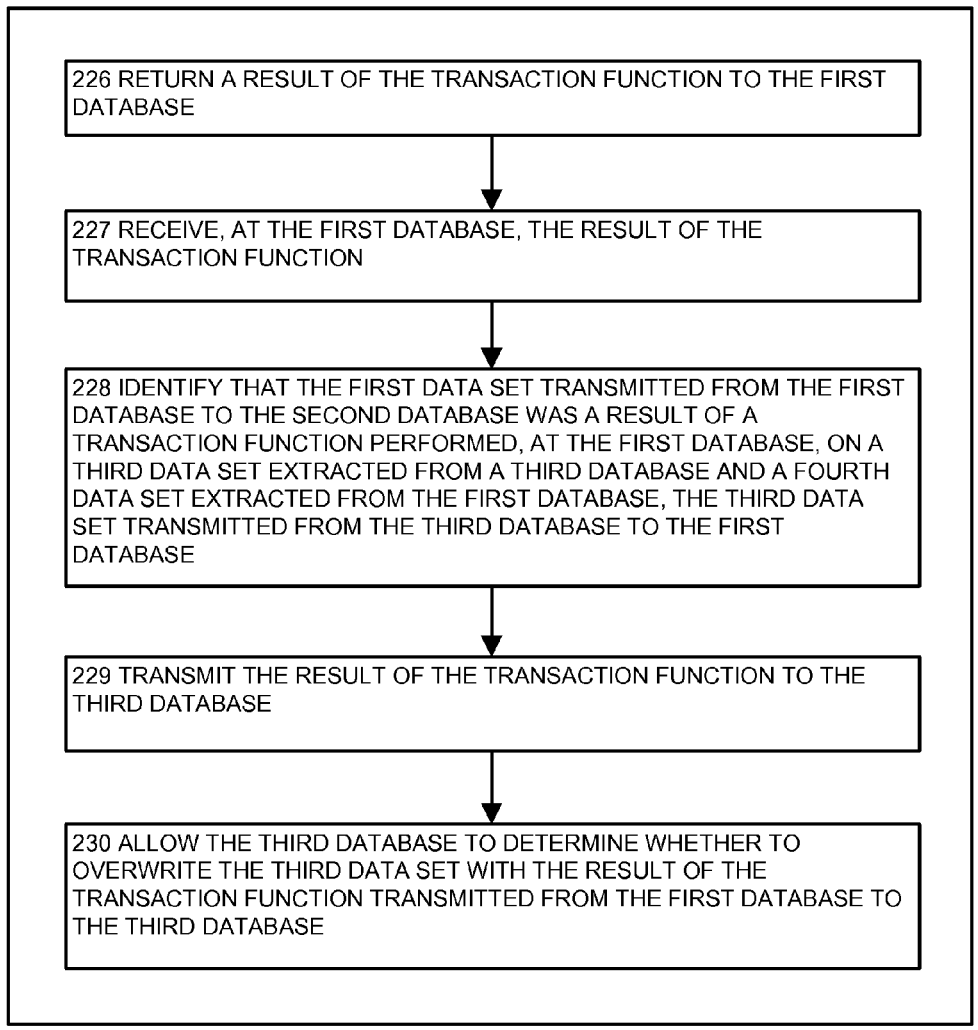
FIG. 10 is a continuation of FIG. 9 of the flowchart of the steps performed by the centralized data store creating process 145-2 when it returns a result of the transformation function to the first database 130-1.

FIG. 10 is a continuation of FIG. 9 of the flowchart of the steps performed by the centralized data store creating process 145-2 when it returns a result of the transaction function to the first database 130-1.

In step 226, the centralized data store creating process 145-2 returns a result of the transaction function to the first database 130-1. In an example embodiment, the transformation function was performed at the second database 130-2, and transmitted to the first database 130-1.

In step 227, the centralized data store creating process 145-2 receives, at the first database 130-1, the result of the transaction function that was performed at the second database 130-2. The transformation function was performed on a first data set 155 (transmitted from the first database 130-1 to the second database 130-2) and a second data set 155 (extracted from the second database 130-2).

In step 228, the centralized data store creating process 145-2 identifies that the first data set 155 transmitted from the first database 130-1 to the second database 130-2 was a result of a transaction function performed, at the first database 130-1, on a third data set 155 extracted from a third database 130-3 and a fourth data set 155 extracted from the first database 130-1. The third data set 155 was transmitted from the third database 130-3 to the first database 130-1. In other words, a third data set 155 was extracted at the third database 130-3, and transmitted (along with origination information) from the third database 130-3 to the first database 130-1. Thus, the first database 130-1 has the third data set 155 and knows that this third data set 155 originated from the third database 130-3. The first database 130-1 extracts a first data set 155 from the first database 130-1. The first database 130-1 performs a transformation function between the first data set 155 and the third data set 155. The first database 130-1 sends the result of this transformation function to the second database 130-2. The second database 130-2 performs a transformation function on a second data set 155 (extracted from the second database 130-2) and the first data set 155 transmitted to the second database 130-2 from the first database 130-1. Note that the first data set 155 is actually the result of a transformation function performed between a fourth data set 155 extracted from the first database 130-1 and a third data set 155 extracted from the third database 130-3. The result of the transformation function performed at the second database 130-2 is transmitted back to the first database 130-1.

In step 229, the centralized data store creating process 145-2 transmits the result of the transaction function to the third database 130-3. When the third database 130-3 transmitted the third data set 155 from the third database 130-3 to the first database 130-1, the third database 130-3 also sent origination information. Thus, when the first database 130-1 receives the results of the transformation function (performed at the second database 130-2) from the second database 130-2, the first database 130-1 knows that the results of the transformation function are to be transmitted back to the third database 130-3.

In step 230, the centralized data store creating process 145-2 allows the third database 130-3 to determine whether to overwrite the third data set 155 with the result of the transaction function transmitted from the first database 130-1 to the third database 130-3. When the third database 130-3 receives the results of the transformation function (performed at the second database 130-2 but transmitted to the third database 13-3 from the first database 130-1), the centralized data store creating process 145-2 allows the third database 130-3 to determine whether to load the results onto the third database 130-3 or to override the data load and retain the original data that was extracted from the third database 130-3.

Figure 11:
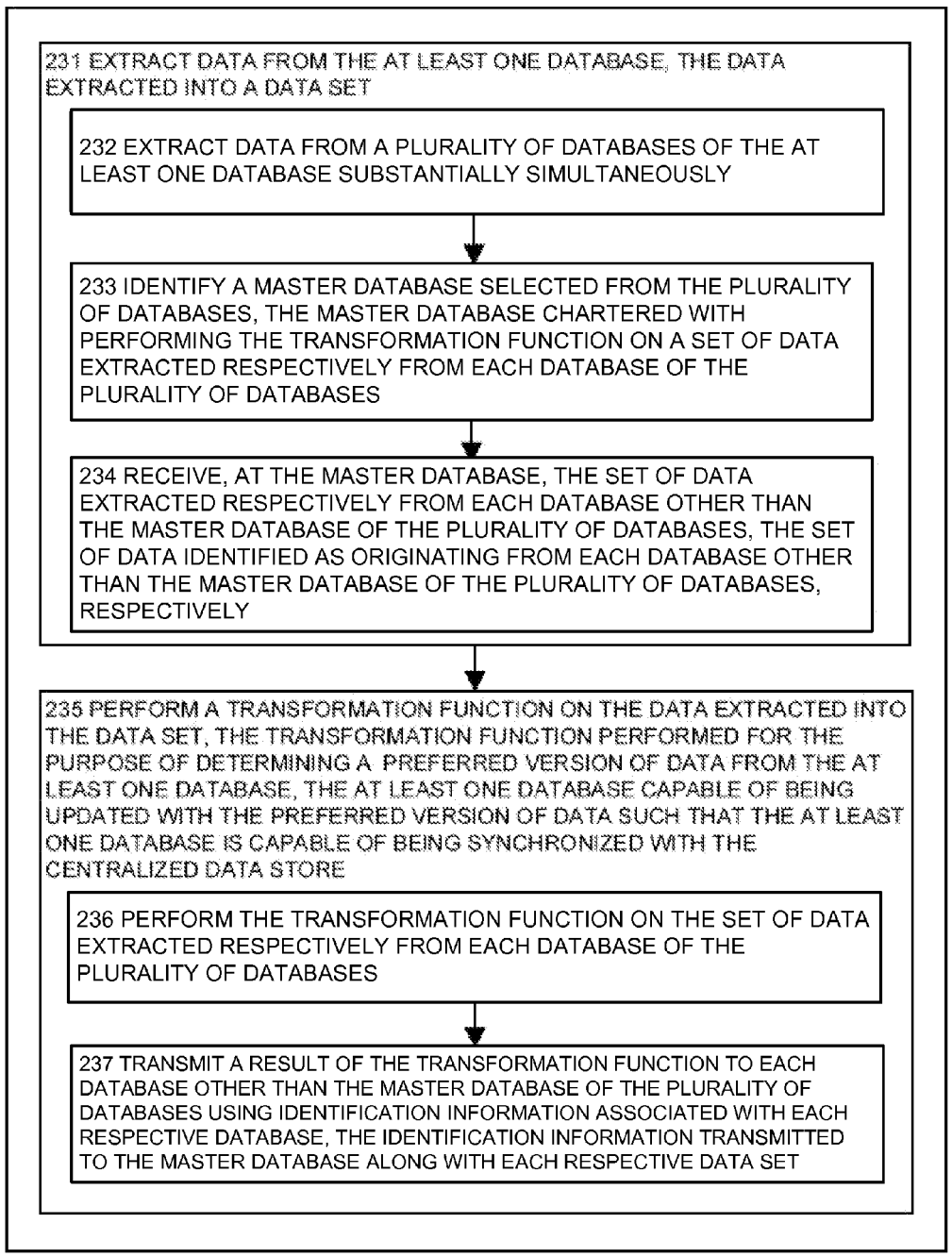
FIG. 11 illustrates a flowchart of a procedure performed by the system of FIG. 1 when the centralized data store creating process extracts data from at least one database, and performs the step of extracting data on a first database simultaneously while performing the step of extracting data on a second database, according to one embodiment disclosed herein.

FIG. 11 is a flowchart of the steps performed by the centralized data store creating process 145-2 when it extracts data from at least one database 130-1.

In step 231, the centralized data store creating process 145-2 extracts data from at least one database 130-1. The data is extracted into a data set 155.

In step 232, the centralized data store creating process 145-2 performs the step of extracting data on a first database 130-1 simultaneously while performing the step of extracting data on a second database 130-2. In this scenario, the centralized data store creating process 145-2 is operating according to the parallel process described in FIG. 1. Here, when the centralized data store creating process 145-2 receives a request for data from an application, the centralized data store creating process 145-2 transmits, simultaneously, the request to each of the databases 130-N that maintain data associated with the request.

In step 233, the centralized data store creating process 145-2 identifies a master database 130-3 selected from the first database 130-1, the second database 130-2 and the third database 130-3. The master database 130-3 is chartered with performing the transformation function on a set of data extracted respectively from the first database 130-1 and the second database 130-2. In other words, the data request is sent to a plurality of databases 130-N. One of the databases 130-3 from the plurality of databases 130-N is identified as the master database 130-3. The master database 130-3 performs the transformation function from the plurality of data sets 155 received from the plurality of databases 130-N.

In step 234, the centralized data store creating process 145-2 receives, at the master database 130-3, the set of data extracted respectively from the first database 130-1 and the second database 130-2. The set of data is identified as originating from the first database 130-1 and the second database 130-2, respectively. In other words, the first database 130-1 extracts data into a first data set 155 and transmits that first data set 155 to the master database 130-3. The second database 130-2 extracts data into a second data set 155 and transmits that second data set 155 to the master database 130-3.

In step 235, the centralized data store creating process 145-2 performs a transformation function on the data extracted into the data sets 155. The transformation function is performed for the purpose of determining a preferred version of data from at least one database. The database 130-1 is capable of being updated with the preferred version of data such that at least one database 130-1 is capable of being synchronized with the centralized data store 160.

In step 236, the centralized data store creating process 145-2 performs the transformation function on the set of data extracted respectively from the first database 130-1 and the second database 130-2. Thus the master database 130-3 performs the transformation function on the first data set 155 received from the first database 130-1 and the second data set 155 received from the second database 130-2.

In step 237, the centralized data store creating process 145-2 transmits a result of the transformation function to the first database 130-1 using identification associated with the first database 130-1. The identification transmitted to the master database 130-3 along with the first data set 155. In other words, when the first database 130-1 transmitted the first data set 155 to the master database 130-3, the first database 130-1 also transmitted origination information identifying the first data set 155 as having come from the first database 130-1. Likewise, the centralized data store creating process 145-2 also transmits a result of the transformation function to the second database 130-2 using identification associated with the second database 130-2.

Figure 12:
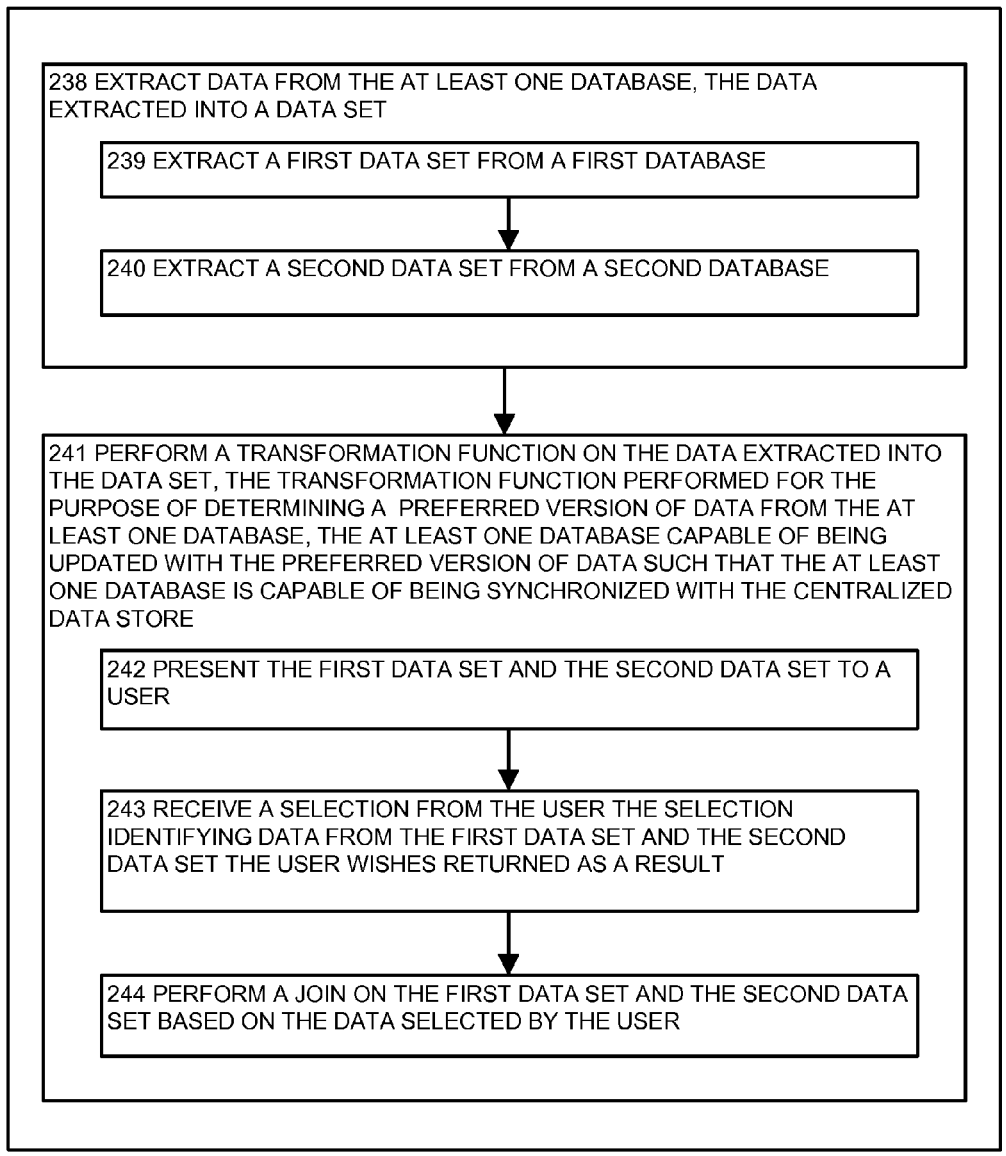
FIG. 12 illustrates a flowchart of a procedure performed by the system of FIG. 1 when the centralized data store creating process extracts data from at least one database, extracting a first data set from a first database, according to one embodiment disclosed herein.

FIG. 12 is a flowchart of the steps performed by the centralized data store creating process 145-2 when it extracts data from at least one database 130-1.

In step 238, the centralized data store creating process 145-2 extracts data from at least one database 130-1. The data is extracted into a data set 155.

In step 239, the centralized data store creating process 145-2 extracts a first data set 155 from a first database 130-1. The data set 155 may be transmitted to the centralized data store 160, the master database 130-3 (in the case of parallel operation), or the second database 130-2 (in the case of sequential operation).

In step 240, the centralized data store creating process 145-2 extracts a second data set 155 from a second database 130-2. As noted above, the data set 155 may be transmitted to the centralized data store 160, the master database 130-3 (in the case of parallel operation), or a fourth database 130-4 (not shown) (in the case of sequential operation).

In step 241, the centralized data store creating process 145-2 performs a transformation function on the data extracted into the data set. The transformation function is performed for the purpose of determining a preferred version of data from at least one database. The database 130-1 is capable of being updated with the preferred version of data such that at least one database 130-1 is capable of being synchronized with the centralized data store 160.

In step 242, the centralized data store creating process 145-2 presents the first data set 155 and the second data set 155 to a user (not shown). This provides the user with the opportunity to control which version of the data sets 155 the user wishes to use.

In step 243, the centralized data store creating process 145-2 receives a selection from the user. The selection identifies data from the first data set 155 and the second data set 155 that the user wishes returned as a result of the transformation function.

In step 244, the centralized data store creating process 145-2 performs a join on the first data set 155 and the second data set 155 based on the data selected by the user.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides an associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes could execute on a small set of dedicated computers, or on one computer alone.

It is to be understood that the system disclosed herein can be strictly as a software program, as software and hardware, or as hardware alone. Example embodiments disclosed herein may be implemented within EMC's Control Center® storage area network management software application that provides management functionality for storage area network resources and in computerized devices that operate the Control Center® software. Control Center® is manufactured by EMC Corporation of Hopkinton, Mass., USA.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A method of creating a centralized data store from a plurality of databases, the method comprising:
   receiving a request for data from an application;
   extracting data responsive to the request for data from each database of the plurality of databases into a data set respective to each database of the plurality of databases, the plurality of databases having a plurality of respective versions of data responsive to the request for data;
   determining a preferred version of the data responsive to the request for data from the plurality of data sets extracted from the plurality of databases for loading into the centralized data store by performing a transformation function on the respective data sets;
   updating each database of the plurality of databases with the preferred version of the data responsive to the request for data from the plurality of data sets extracted from the plurality of databases according to a result of the transformation function such that the plurality of databases is configured to synchronize with the centralized data store;
   loading the preferred version of the data responsive to the request for data into the centralized data store; and
   returning the preferred version of the data from the centralized data store to the application in response to the request for data.

2. The method of claim 1 further comprising:
   recursively performing the steps of extracting, performing and loading.

3. The method of claim 1 wherein updating each database of the plurality of database with the preferred version of the data responsive to the request for data from the plurality of respective date sets extracted from the plurality of databases according to a result of the transformation function such that the plurality of databases is configured to synchronize with the centralized data store comprises:
   allowing each respective database of the plurality of databases to determine whether to be updated with the preferred version of data; and
   updating each database of the plurality of databases according to the determination.

4. The method of claim 1 further comprising:
prior to the step of extracting data from the plurality of databases, intercepting a database transaction when the database transaction attempts to establish a connection with a respective database of the plurality of databases to enable differential processing.

5. The method of claim 4 wherein, intercepting a database transaction when the database transaction attempts to establish a connection with a respective database of the plurality of databases comprises:
identifying an existing database connection with the respective database; and
leveraging at least one interceptor against the existing database connection to provide a consistent interception point with which to detour the database transaction from the respective database to the centralized data store, the consistent interception point allowing consistent data to be provided by the respective database and the centralized data store to an application that initiated the database transaction.

6. The method of claim 5 further comprising:
utilizing the at least one interceptor with respect to the existing database connection to enable a concurrency model for the purpose of providing data consistency from the respective database and the centralized data store.

7. The method of claim 5 further comprising:
providing functionality allowing an application developer to programmatically manipulate the consistent data at the point of the existing database connection.

8. The method of claim 1 further comprising:
after the step of loading the preferred version of data into the centralized data store, returning the preferred version of data to the application that initially established a connection with the plurality of databases, the connection established for the purpose of requesting the data from each database of the plurality of databases, the preferred version of data supplied by the centralized data store.

9. The method of claim 1 further comprising:
receiving a new request for data from an application requesting data from the plurality of databases;
redirecting the new request to the centralized data store; and
supplying the data for the new request from the centralized data store to the application.

10. The method of claim 9 wherein supplying the data for the new request from the centralized data store to the application comprises:
authenticating a connection between the application requesting data from the plurality of databases and the centralized data store;
performing a query on the centralized data store, the query associated with the new request; and
transmitting a result of the query on the centralized data store from the centralized data store to the application.

11. The method of claim 1
wherein extracting data from the plurality of databases, the data extracted into a data set comprises:
extracting a first data set from a first database;
transmitting the first data set from the first database to a second database;
extracting a second data set from the second database; and wherein performing a transformation function on the data extracted into the data set comprises:
performing a transformation function on the first data set and the second data set, the transformation function performed at the second database; and
returning a result of the transformation function from the second database to the first database.

12. The method of claim 11 wherein transmitting the first data set from the first database to a second database comprises:
transmitting origination information along with the first data set, the origination information identifying the first data set as having originated from the first database.

13. The method of claim 11 further comprising:
receiving, at the first database, the result of the transformation function;
identifying that the first data set transmitted from the first database to the second database was a result of a transformation function performed, at the first database, on a third data set extracted from a third database and a fourth data set extracted from the first database, the third data set transmitted from the third database to the first database; and
transmitting the result of the transformation function to the third database.

14. The method of claim 13 further comprising:
allowing the third database to determine whether to overwrite the third data set with the result of the transformation function transmitted from the first database to the third database.

15. The method of claim 1 wherein extracting data from the plurality of databases comprises:
extracting data from each database of the plurality of databases simultaneously.

16. The method of claim 15 further comprising:
receiving, at a master database designated from the plurality of databases, the set of data extracted respectively from each database other than the master database of the plurality of databases, the set of data identified as originating from each database other than the master database of the plurality of databases, respectively;
wherein the master database is chartered with performing the transformation function; and
wherein performing a transformation function on the data extracted into the data set comprises:
performing the transformation function on the set of data extracted respectively from each database of the plurality of databases; and
wherein transmitting a result of the transformation function to each database other than the master database of the plurality of databases comprises transmitting a result of the transformation function to each database other than the master database of the plurality of databases using identification information associated with each respective database, the identification information transmitted to the master database along with each respective data set.

17. The method of claim 1 wherein extracting data from the plurality of databases, the data extracted into a data set comprises:
extracting a first data set from a first database;
extracting a second data set from a second database; and
wherein performing a transformation function on the data extracted into the data set comprises:
presenting the first data set and the second data set to a user;

receiving a selection from the user the selection identifying data from the first data set and the second data set the user wishes returned as a result; and performing a join on the first data set and the second data set based on the data selected by the user.

18. The method of claim 1 wherein performing a transformation function on the data extracted into the data set comprises performing a first transformation function on the data extracted into the data set, the first transformation function performed for the purpose of determining a preferred version of data from the plurality of databases for loading into the centralized data store, the method further comprising:

performing a second transformation function on the preferred version of the data loaded into the centralized data store, the second transformation function performed for the purpose of generating an updated version of the preferred version of data; and loading the updated version of the preferred version of data into the at least one database such that the at least one database is synchronized with the centralized data store.

19. A computerized device comprising:

a memory;

a processor;

a communications interface;

an interconnection mechanism coupling the memory, the processor and the communications interface;

wherein the memory is encoded with a centralized data store creating application that when executed on the processor is capable of creating a centralized data store on the computerized device by performing the operations of:

receiving a request for data from an application;

extracting data responsive to the request for data from each database of the plurality of databases into a data set respective to each database of the plurality of databases, the plurality of databases having a plurality of respective versions of data responsive to the request for data;

determining a preferred version of the data responsive to the request for data from the plurality of data sets extracted from the plurality of databases for loading into the centralized data store by performing a transformation function on the respective data sets;

updating each database of the plurality of databases with the preferred version of the data responsive to the request for data from the plurality of data sets extracted from the plurality of databases according to a result of the transformation function such that the plurality of databases is configured to synchronize with the centralized data store;

loading the preferred version of the data responsive to the request for data into the centralized data store; and returning the preferred version of the data from the centralized data store to the application in response to the request for data.

20. The computerized device of claim 19 wherein the computerized device is capable of performing the operation of:

recursively performing the steps of extracting, performing and loading.

21. A non-transitory computer readable storage medium encoded with computer programming logic that when executed on a processor in a computerized device provides creation of a data store from a plurality of databases, the medium comprising:

instructions for receiving a request for data from an application;

instructions for extracting data responsive to the request for data from each database of the plurality of databases into a data set respective to each database of the plurality of databases, the plurality of databases having a plurality of respective versions of data responsive to the request for data;

instructions for determining a preferred version of the data responsive to the request for data from the plurality of data sets extracted from the plurality of databases for loading into the centralized data store by performing a transformation function on the respective data sets;

updating each database of the plurality of databases with the preferred version of the data responsive to the request for data from the plurality of data sets extracted from the plurality of databases according to a result of the transformation function such that the plurality of databases is configured to synchronize with the centralized data store;

instructions for loading the preferred version of the data responsive to the request for data into the centralized data store; and instructions for returning the preferred version of the data from the centralized data store to the application in response to the request for data.

* * * * *